July 7, 1959  V. C. HAMISTER  2,893,848
FURNACE CONSTRUCTION FOR HIGH TEMPERATURE PURIFICATION
OF CARBONACEOUS BODIES IN HALOGEN-CONTAINING GASES
Filed Oct. 16, 1956
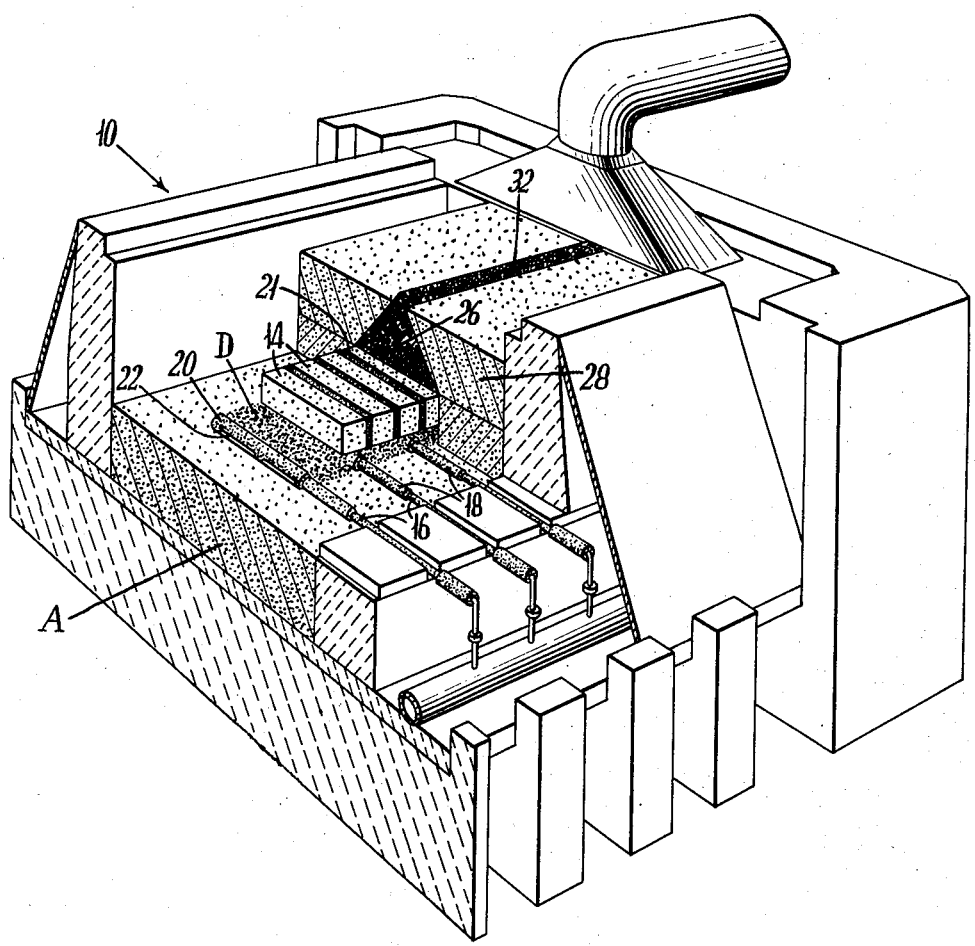
INVENTOR
VICTOR C. HAMISTER
BY
ATTORNEY United States Patent Office 2,893,848
Patented July 7, 1959

2,893,848

FURNACE CONSTRUCTION FOR HIGH TEMPERATURE PURIFICATION OF CARBONACEOUS BODIES IN HALOGEN-CONTAINING GASES

Victor C. Hamister, Lakewood, Ohio, assignor to Union Carbide Corporation, a corporation of New York Application October 16, 1956, Serial No. 616,271

5 Claims. (Cl. 23—277)

This invention relates to improvements in electric graphitizing furnaces used in the high temperature purification of carbonaceous bodies.

For quite some time the conventional Acheson graphitizing furnace of the type described in U.S. Patent 702,758 has been used to heat carbon bodies to temperatures high enough to transform their disordered structure to its crystalline modification by passing a current through a core composed of these bodies, and separated from one another by granular carbon particles. Thermal insulation of this core has been achieved by use of mixtures of coke and siliceous materials. With this furnace arrangement the high resistance of the siliceous envelop confines the flow of electric current through the assembly of carbon bodies and granular carbon. The usual source of this granular carbon is metallurgical coke crushed and sized to a typical screen specification of through 3 mesh on 14 mesh (Tyler screen scale).

The product obtained in such a furnace, while satisfactory for many applications, still contains certain impurities. Lately methods have been devised for removing the last traces of such impurities in the form of volatile reaction products. These methods usually require the subjection of the articles to be purified to the action of halogen-containing gases at high temperatures, such that the impurities reacting with the gases will volatilize.

In the practice of the newer purifying methods outlined above, it is not feasible to surround the core with the conventional siliceous insulating materials such as sand or silicon carbide, because of their reactivity with halogen-containing gases at temperatures contemplated by the above-outlined methods.

It is also necessary for the successful carrying out of purification methods involving the passage at high temperature of reactive halogen-containing gases around or about carbonaceous bodies to confine gas flow to the useful work zone. It is not possible to do so in conventional furnaces, because the particle size of the insulating material used therein is such that gas may readily permeate it, regardless of the degree to which it is packed. Inasmuch as certain gases found after passage of the indicated reactive gases are toxic, the operation of a series of furnaces within a given confine is too dangerous if means are not provided to secure by-product gas removal.

Accordingly, the main object of this invention is to provide a novel, large size, resistance type, electric furnace construction for the purification, in halogen-containing gases, of tonnage quantities of carbonaceous bodies.

A further object of this invention is to provide an electric furnace construction in which the flow of electric current is exclusively confined to the useful work zone.

A still further object of the invention is the provision in an electric furnace of novel means for confining the purified halogen-containing gas to the useful work zone of the furnace.

An additional object of this invention is the provision of novel means for injecting halogen-containing gas into the purifying zone of an electric furnace.

A related object of the invention is the provision of an electric furnace structure wherein a uniform flow distribution of the purifying gas employed is maintained.

A practical object of this invention is to provide means for preventing the escape of gases from the furnace bottom, such gases being directed to the furnace top.

A useful object of the invention is to provide an electric furnace structure having novel means for segregating and removing impurities volatilized from the carbonaceous articles purified therein.

The invention by means of which the above objects are achieved comprises the provision in an electric furnace of granular graphite resistors used between the articles being purified to confine the flow of current to the useful work zone; low permeability, all-carbon flour to provide thermal insulation and confine the purifying halogen-containing gas; carbon-graphite tube assemblies to convey such gas into the purifying zone; relatively impermeable, properly sized carbon and graphite particles positioned under and around the articles being purified to insure a uniform flow distribution of purifying gas and a porous carbon venting area in the top insulating furnace cover to permit segregation and easy removal of impurities volatilized from the articles purified. As a result of the incorporation therein of the above features, the furnace of the invention is substantially gas-impermeable on the three sides, so that gases are forced up the furnace top, thereby avoiding dangerous build-up of toxic gases.

In the drawings, the single figure is a cut-away isometric view of a furnace construction embodying the enumerated features of the invention, and showing also the spatial relationship of the furnace charge.

There is shown in the single figure, a graphitizing furnace shown generally by the reference character 10. The furnace core between the electric heads (not shown) consists of a plurality of carbonaceous blocks, which is the charge to be purified. Typically, such core may be made up to 28, 4 inch x 4 inch x 20 inch carbon bars 14, spaced one inch apart. Electrical contact from one bar to the next is established by filling this space between bars 14—14 with graphite granules. Furnace bed A and the packing material sealing the tubular connections carrying reagent gas into the furnace are composed of a low permeability, non-siliceous, carbonaceous mixture. Such a mixture possessing low gas permeability and good packing property suitably may contain a blend of four parts by weight of granulated coke with one part by weight of an impalpable carbon powder. The granules are sized by crushing or grinding lump coke, so that all will pass through a 14 mesh Tyler screen (0.025 inch), and 90 percent will be retained on a 100 mesh Tyler screen (0.0042 inch). The impalpable carbon powder is of the kind obtained from dust-collecting systems. More than 80 percent of the particles are smaller than 75 microns. This blend having a specific permeability ranging from 1 to 20 Darcys, has a high resistance to gas flow. It can be tamped to form a solid bed 12 inches thick, which will show only faint footprints when walked upon by a man of average weight.

The tube assembly for conveying reagent gas into the furnace consists of three inter-fitting elements. Tube 16, the inlet tube, is made from non-crystalline carbon type of a low heat conductivity less than 10 (B.t.u.) ft./sq. ft., ° F./hr. A size conveniently used in many furnaces is one having an internal diameter of 0.25 inch, external diameter of 0.875 inch and a length of 20 inches. The low heat conductivity carbon at this point restrains heat flow from the hot furnace charge sufficiently, so that the end emerging from the furnace maintains relatively low temperature. Accordingly, it is possible to use rubber tubing when connecting the carbon tube assembly to external distribution manifolds. In the practice of the invention it has been found advantageous to place in these manifolds, manifold discs having a plurality of orifices about 30 mils in diameter.

Element 18 of this assembly is a non-crystalline carbon tube which suitably may have an inside diameter of about one inch, an external diameter of 1½ inches, and a length of about 9 inches.

The third element 20 of the assembly, the distributor tube, is made up of graphite. A convenient size for this element is one having an internal diameter of two inches, external diameter of 2⅝ inches, and a length of about 4 inches more than the length of the carbon body which is to be purified. A longitudinal slot, which for this size is ⅜ inch wide, is cut into the tube at 22. The length of the slot is made about four inches less than the tube length in order to retain sufficient structural strength in the distributor tube. The position of the slot is important. For best results it should be either at the 4 or 8 o'clock positions when viewed from the end of the tube. At other positions of the slot, granular material may flow into the distributor tube, or if the slot is placed directly upon the tamped bed, gas flow will be impaired, thereby interfering with the desired reaction.

As stated above, resistor material composed of granulated graphite establishes contact from one carbon bar in the furnace to the next. An arrangement is provided so that the granular material below the bars and surrounding the distributor tubes will cause less resistance to gas flow than will the resistor material between bars. This is effected by providing a material below the bars and surrounding the distributor tube, and is composed of through 3 on 10 mesh Tyler scale screen graphite material D (0.07 to 0.035 inch), while the resistor material 21 is composed of through 10 on 20 mesh graphite material (0.035 to 0.0172 inch). The mass of coarse particles has a permeability ranging from 6000 to 12,000 Darcys, whereas the similar mass of fine particles has a permeability ranging from 600 to 1200 Darcys. This arrangement of fine and coarse graphite material insures uniform gas flow around each of the carbon or graphite bodies to be purified.

In accordance with this invention, means are also provided for venting and concentrating impurities removed from the carbonaecous bodies by contact with the halogen-containing gas. For this purpose a carbon cover is provided for the carbon bars, which cover consists of two components—a triangularly cross-sectioned zone 26 running along the length of the furnace over bars 14, and consisting of through 3 on 14 mesh coke or graphite particles (0.070 to 0.025 inch), and a side cover member 28 composed of granulated coke screened through 20 mesh (0.0172 inch), retained on 100 mesh (0.0042 inch), which covers zone 26 leaving its tip 32 exposed. Permeability of material 26 is about 10 times that of the material 28. Owing to the mass permeability differences between materials 26 and 28, effluent gases resulting from the reaction of halogen-containing gases with the furnace charge funnel upward through the triangular section of 26 at 32. This upward flow of gases is quite extensive, since the low permeability of the furnace bed substantially prevents gas flow through the furnace bottom. By having the apex of the triangle extending an inch or two above the general level of the cover material, a vent is provided for substantially all the reaction products. An unknown fraction of these products condenses in conveying space 32, leaving a slag-like substance which can be broken up into short lengths and discarded. In this way a build-up of impurities in the cover materials is prevented, and these may be re-used.

The use of a carbonaceous mixture on the sides and bottom of the produce core, which mixture is relatively impermeable to gas flow, confines the gas stream to a useful work zone. In addition to the advantages mentioned above, the present improvements call for a tube assembly for conveying the reagent gas into the furnace, which assembly includes an expansion chamber. When halogen-containing reagent gases such as carbon tetrachloride or difluorodichloromethane are passed into the furnace, gaseous decomposition takes place, liberating free carbon upon the hot end of the inlet tube walls. If the inlet tube bore is small enough, this carbon deposit can completely obstruct the tube, and stop the flow of gas. In the present construction, the provision of a larger bore tube in element 18 furnishes an expansion chamber where the carbon deposit can build up without interfering with gas flow.

By use of graphite granules between the carbon bars as above indicated, the current path between furnace electrode heads may be confined to the core being treated. If, instead, the spacing were filled with conventional material such as sized metallurgical or petroleum coke particles, the higher specific resistance of these materials would divert the current path out to the surrounding carbon heat-insulating material, and particularly into the bed marked "A," where the weight of the bars might compact the bed material, and greatly lower the electrical resistance at that point.

Conducive to a better understanding of the degree of purity of the graphite obtained by the employment of the furnace features heretofore disclosed, recourse will be had to a measurement called "DIH." As employed herein, "DIH" is the difference between the pile reactivities using two different types of graphite, and is related to the respective abilities of similar cross-sections of graphite materials to transmit, without absorbing, thermal neutrons. The material used as a reference standard is graphite purified only by high temperature graphitization. Repeated experiments have shown this material to be not completely satisfactory for moderator or reflector use in thermal reactors because it contains impurities capable of absorbing neutrons. It is arbitrarily assigned the DIH value of 0.

In determining DIH values, the reference material is placed intermediate a reactor pile having a known or ascertainable critical point, and a control rod of cadmium. Using this rod it is possible to determine the neutron density passing through the graphite. Neutron density is then plotted against time in hours. Noted next is $T_0$, the time required for this density to reach the known critical point of the pile, or that point where the pile produces as many neutrons as it loses. The reference graphite is then replaced by a fragment of graphite whose critical point is desired, this fragment having the same cross-section as the reference material, and the same measurements taken. The time required to reach the critical point with this material is $T_T$. The more reactive a graphite material makes a given pile, the less the time required to reach the critical point. Stated otherwise, the reactivity $(d_0)$ of the reference material is inversely proportional to time or $$d_0 = \frac{1}{T_0} \text{ (hours)} = \frac{1}{T_0} \text{ (inhours)}$$

The difference in reactivity between the material to be tested and the standard is $$\text{DIH} = d(d) = d_T - d_0 = \frac{1}{T} - \frac{1}{T_0} \text{ inhours}$$

Thus, if the DIH value of a graphitic material is positive, this material may be said to make the pile more reactive than the standard. Conventionally the unit "inhours" is defined as that reactivity which will make the stable reactor period equal to one hour. This unit is also defined as the time required for the neutron flux to increase by a factor of the Naperian base of $e$.

Using only one feature part of the furnace arrangement disclosed herein, it is possible to achieve substantial improvements in the above-defined DIH value of graphite. Table I below lists DIH values for adjacent groups of bars tested after treatment in a furnace having the low permeability, all-carbonaceous bed above disclosed, and in which gas inlets were positioned under every bar group.

*Table I*
GROUP OF BARS TESTED

| (one end of Furnace) | | | |
|---|---|---|---|
| .929 | .964 | .957 | .829 |
| .855 | .924 | .882 | .880 |
| .990 | .974 | .956 | .956 |
| .968 | .942 | .804 | .873 |
| .944 | .826 | .879 | .909 |
| .928 | .931 | .963 | .933 |
| .854 | .704 | .778 | .873 |
| .566 | .870 | .778 | .741 |
| .930 | .686 | .906 | .917 |
| .978 | .972 | .973 | .977 |
| .855 | .936 | .863 | .946 |
| .926 | .920 | .984 | .948 |
| .800 | .794 | .953 | .978 |
| (opposite end of Furnace) | | | |

Where the other features of the invention are provided in the furnace, it is possible to obtain still higher and more uniform DIH values for the individual bars of a given charge. One reason for this is the improvement in gas distribution by using low permeability graphite granules as resistor material between the bars, so that in effect the spacing between bars functions like orifices in pipe.

Typical DIH values obtainable with carbon bars treated in a furnace embodying the invention are given in Table II below. It is to be noted that these values were obtained using one gas inlet under every three bar groups in the furnace.

*Table II*

| Bar Nos. | DIH |
|---|---|
| (One end of Furnace) | |
| 1, 2, 3 | 1.038 |
| 4, 5, 6 | 1.020 |
| 7, 8, 9 | 1.024 |
| 10, 11, 12 | 1.014 |
| 13, 14, 15 | 1.038 |
| 16, 17, 18 | 1.026 |
| 19, 20, 21 | 1.020 |
| 22, 23, 24 | 1.028 |
| 23, 24, 25 | 1.024 |
| (Opposite end of Furnace) | |
| Average | 1.026 |

In practice, the firing operation for the furnace arrangement of the invention can be divided into four successive schedules, in which the boundaries are defined by the kind of gas metered into the furnace at different temperatures.

In the first schedule electric power was turned on with nitrogen flowing in at about 25 cubic feet per hour, until the charge temperature reaches 1000° C. Power input is kept below 150 k.v.a. to prevent cracking of the bars. the total time for this schedule was from 2½ to 3 hours.

Next chlorine gas was fed in at the rate of four pounds per hour for two hours. Power input was increased to bring the charge to a temperature of 1700° to 1800°.

Next difluorodichloromethane was injected at a rate of 12 pounds per hour for four hours. The power was adjusted so as to reach a temperature of 2450° to 2500° within three hours later. Injection of this gas continued for one hour after power was turned off, and while the furnace was cooling down to about 2200°.

The last schedule is one of 16 to 18 hours during which nitrogen gas is fed into the furnace at a rate of about 25 cubic feet per hour, while charge temperature drops to about 1000° C.

An important advantage of the furnace arrangement of the invention is that noxious gases will not escape through the furnace bottom owing to the impermeability of the carbon material provided therein. This safety feature permits the installation of many such furnaces within a given confine without danger of accumulating a dangerous concentration of toxic gases.

The removal of the last traces of impurity from the graphite product obtained by the furnace arrangement of the invention achieves great importance when the graphite is to be used as a moderator in thermal reactors to reduce neutrons of fission in which it serves energy to thermal energy. Among other carbonaceous articles which may be treated in the furnace of the invention are electrolytic anodes for mercury cells, electric graphitic brush stock, thermic anodes and arc electrodes for spectrochemical analysis.

What is claimed is:

1. In an elongated electric graphitizing furnace of the type wherein purifying gases are passed to remove volatilizable impurities from the carbonaceous articles under heat treatment therein, a furnace bed composed of a low mass permeability, non-siliceous mixture of carbon having a high resistance to gas flow; graphite contact material intermediate said carbonaceous articles under treatment and having a higher permeability than said carbon mixture; a tubular assembly for conveying purifying gas into said furnace, said assembly including an expansion chamber therein; means for concentrating and segregating impurities from said carbonaceous articles under heat treatment by reaction with said purifying gases, said means comprising a first cover member section extending lengthwise in said furnace covering said carbonaceous articles under treatment, and a second cover member section to either side of said first section, said first section consisting of carbonaceous particles of a larger size and greater mass permeability than said second section.

2. A furnace as in claim 1 wherein the mass permeability of said carbon material forming said furnace bed ranges from 1 to 20 Darcys, and consists of about 4 parts by weight of granulated coke with one part by weight of impalpable carbon powder, such that about 80 percent of the mixture has a particle size less than 75 microns.

3. A furnace as in claim 1, wherein the assembly for conveying purifying gas in said furnace consists of a plurality of interfitting tubular carbon elements including at least an inlet tube composed of a low heat conductivity carbon, a carbon sleeve having a diameter such as to provide an expansion chamber therein, said sleeve interconnecting said inlet tube with a graphite distributor tube having a longitudinal slot.

4. A furnace as in claim 1, wherein the graphitic material between the articles subjected to heat treatment has a mass permeability of between 600 to 1200 Darcys.

5. A furnace according to claim 1, wherein the means for concentrating and segregating impurities volatilized from the carbonaceous articles subjected to treatment consist of a triangularly cross-esctioned first cover member extending lengthwise, and consisting of through 3 on 14 mesh carbon particles, a second cover member to either side of said first member so disposed as to leave the tip of said first cover member exposed, said second member consisting of 20/100 particle size carbon dust.

References Cited in the file of this patent

UNITED STATES PATENTS

| 702,758 | Acheson | June 17, 1902 |
| 1,411,537 | Sullivan | Apr. 4, 1922 |
| 1,576,883 | Weaver | Mar. 16, 1926 |
| 2,734,800 | Brooks | Feb. 14, 1956 |
| 2,734,801 | Brooks | Feb. 14, 1956 |